United States Patent
Minks et al.

[11] Patent Number: 6,059,996
[45] Date of Patent: May 9, 2000

[54] LOW-VISCOSITY COOLANT BRINES HAVING IMPROVED CORROSION PROTECTION

[75] Inventors: Peter Minks, Altötting; Johann Schuster, Kastl, both of Germany

[73] Assignee: Clariant GmbH, Frankfurt, Germany

[21] Appl. No.: 09/135,267

[22] Filed: Aug. 17, 1998

[30] Foreign Application Priority Data

Aug. 12, 1997 [DE] Germany .......................... 197 35 717

[51] Int. Cl.$^7$ .............................. C09K 3/00; C23F 11/00; C23F 11/06; C04B 9/02
[52] U.S. Cl. .............................. 252/395; 252/387; 422/7; 422/13; 106/14.05; 106/14.11; 106/14.21; 106/14.23; 106/14.26; 106/14.33; 106/14.38; 106/14.43
[58] Field of Search .................................. 252/387, 395; 422/7, 13; 106/14.05, 14.11, 14.21, 14.23, 14.26, 14.33, 14.38, 14.43

[56] References Cited

U.S. PATENT DOCUMENTS

| | | | |
|---|---|---|---|
| 3,948,792 | 4/1976 | Watsën et al. ........................... | 252/387 |
| 3,962,109 | 6/1976 | Oberhofer et al. ....................... | 252/75 |
| 5,071,582 | 12/1991 | Conville et al. ......................... | 510/184 |
| 5,811,026 | 9/1998 | Phillips et al. ............................ | 252/74 |

FOREIGN PATENT DOCUMENTS

| | | |
|---|---|---|
| 0306972 | 3/1989 | European Pat. Off. . |
| 0 677 563 A1 | 10/1995 | European Pat. Off. . |
| 41 07 442 A1 | 9/1992 | Germany . |
| 44 12 954 A1 | 10/1995 | Germany . |
| WO 96/26990 | 9/1996 | WIPO . |

OTHER PUBLICATIONS

XP002086519, Section Ch, Week 9412 –Derwent Publications Ltd. London, GB; Class E19, AN 94–098047 & JP 06049442 A (CCI KK), Feb. 22, 1994.

*Primary Examiner*—Gabrielle Brouillette
*Assistant Examiner*—Monique T. Cole
*Attorney, Agent, or Firm*—Hesna J. Pfeiffer; Scott E. Hanf

[57] ABSTRACT

The invention relates to low-viscosity, aqueous coolant brines based on inhibited alkali metal acetates and/or formates having improved corrosion protection, wherein the coolant brines contain 0.2 to 5% by weight of alkali metal sulfites or pyrosulfites, in particular 1 to 2.5% by weight of these sulfites. The brines according to the invention furthermore contain 0.3 to 5% by weight of basic substances from the alkali metal carbonates, hydroxides, borates and phosphates group and also 0 to 0.3% by weight of alkali metal silicates and 0.02 to 0.2% by weight of stabilizers from the triazoles, benzimidazoles and/or mercaptothiazoles group. The novel coolant brines result in very low corrosion rates, in particular with steel and cast iron.

11 Claims, No Drawings

LOW-VISCOSITY COOLANT BRINES HAVING IMPROVED CORROSION PROTECTION

BACKGROUND OF THE INVENTION

Coolant brines based on aqueous solutions of organic salts have a markedly lower viscosity than brines based on ethylene glycol or propylene glycol, in particular at low temperatures in the range from −20 to −40° C. A further advantage is their physiological acceptability, such that they can be preferably employed in the foodstuffs sector for indirect cooling (for example freeze-drying, deep-freeze cabinets). A high water content of over 40% by weight renders the brines nonflammable. Due to the low viscosity, considerable energy savings can be achieved by recirculation. Due to the high water content, advantageous heat technology and refrigeration properties are additionally achier ed, for example a high specific heat and a high heat transfer coefficient.

DE-A44 12 954 (EP-A-0 677 563) proposes aqueous potassium formate solutions, which contain up to 55% by weight of formate and are utilizable to −55° C., as coolants. As an inhibitor, these brines contain 1,2,4-triazole and/or borax. In the absence of borax, a pH indicator, preferably phenolphthalein, is added for control of the pH. DE-A41 07 442 describes functional fluids, which essentially contain potassium acetate and potassium carbonate as an aqueous solution and which are inhibited against corrosion using small amounts of potassium fluoride, alkali metal salts of silicic acids and known inhibitors, for example benzotriazole, as heat transfer media and coolants.

A great problem of the cooling fluids mentioned is the corrosion of metallic materials caused by oxygen, in particular the corrosion of ferrous metals (iron, nickel, cobalt). Even if the cooling system is carefully flushed with nitrogen, in practice it can hardly be avoided that in the relatively long term air forces its way in again. The customary inhibitors from the silicates, phosphates and aromatic triazoles group in the long term are not effective enough in order to protect components made of ferrous metals, in particular of steel or gray iron.

Whereas concentrated aqueous solutions having a content of more than 40% by weight of potassium formate or potassium acetate, which contain the inhibitors mentioned, as a rule have a less corrosive action, this does not apply to dilute solutions. On increasing dilution with water, formic acid is formed from formates and acetic acid is formed from acetates by hydrolysis, which finally leads to a fall in the pH value and an increase in the corrosion rate.

SUMMARY OF THE INVENTION

The present invention relates to aqueous, low-viscosity coolant brines which contain metal salts of short-chain carboxylic acids, potassium formate and/or potassium acetate being preferred. As a rule, the salt content is between 20 and 60% by weight, depending on the degree of frostproofing desired. It was the object of the invention to find a coolant which has a good corrosion protection even in aqueous dilution in a frostproofing range from −10 to −40° C. A further aim was to make it possible for the user to prepare a ready-to-use coolant brine according to its antifreeze specification by simple mixing of a concentration with a high degree of frostproofing and water. Thus it should also be avoided that the user would have to add a specially formulated inhibitor batch for each adjustment to a specific degree of frostproofing. The inhibitors added to the concentration should themselves have an antifreeze action without significantly increasing the viscosity. This is achieved according to the invention in that an effective amount of a sulfite is admixed to the coolant based on potassium formate and/or acetate, it surprisingly being found that the sulfites added still dissolved completely in an amount from 0.2 to 5, preferably 0.5 to 3, in particular 1.5 to 2.5, % by weight even at −40° C. Within the sulfite group, alkali metal sulfites are preferred, in particular sodium sulfite and potassium sulfite. However, it is also possible to employ acidic sulfites (bisulfites, pyrosulfites) which as a rule are more highly soluble than the normal sulfites. As an additional protective measure, it is advisable to inertize the closed coolant circulation with nitrogen in order to avoid oxidation of the sulfite or hydrogen sulfite.

DESCRIPTION OF THE PREFERRED EMBODIMENTS

Additionally, alkaline substances such as, for example, potassium carbonate, sodium carbonate, potassium hydroxide solution and/or sodium hydroxide solution, potassium phosphates and borax are added to the coolant brines according to the invention to increase the pH in order still to guarantee an adequate reserve alkalinity even on dilution of the abovementioned concentrations. The added amounts required are between 0.3 and 5% by weight. Furthermnore, known nonferrous metal inhibitors for copper, gunmetal and brass from the triazoles, imidazoles, benzotriazoles (preferably 1,2,4-benzotriazole, 1H-benzotriazole) and the mercaptobenzothiazoles group are employed in amounts from 0.02 to 0.2% by weight. To improve the corrosion protection on aluminum materials, it is possible to use silicates, for example sodium metasilicate, waterglass and potassium silicates in an amount of up to 0.3% by weight.

To test the corrosion behavior, the examination which is widespread in industry as specified in ASTM D 1384-94 is used, which is carried out over a period of 336 h while passing through atmospheric oxygen (6 l of air/h) at a temperature of 88° C. This simulates not only the unavoidable access of air into the coolant brine, but also the behavior at higher temperatures. As is known, refrigeration plants must be defrosted at regular intervals, which can be brought about by means of a so-called warm brine, that is using a brine of a temperature from +50 to +80° C.

The following examples show the composition and the corrosion behavior in the above ASTM test in undiluted form and on dilution with demineralized water. For comparison, the corrosion values without the addition of sulfites according to the invention are shown (Comparison Examples 1 to 4). Percentage data relate—if not stated otherwise—to percentages by weight. The difference to 100% by weight is in each case demineralized water.

EXAMPLE 1

46% of potassium acetate
3% of potassium carbonate
1% of sodium sulfite
0.05% of potassium phosphate
0.1% of 1H-tolyltriazole
0.05% of 1H-benzotriazole
Comparison Example 1 (prior art)
46% of potassium acetate
3% of potassium carbonate
0.05% of potassium phosphate
0.1% of 1H-tolyltriazole
0.05% of 1H-benzotriazole Corrosion values according to ASTM D 1384-94 (material removed in g/m$^2$)

|  | Example 1 | | Comparison Example 1 | |
| --- | --- | --- | --- | --- |
| Metal | undiluted | diluted 1:1 | undiluted | diluted 1:1 |
| Copper | −1.0 | −1.3 | −1.4 | −1.2 |
| Brass | −2.3 | −2.0 | −3.0 | −1.8 |
| Steel | −2.7 | −4.3 | −5.3 | −110.8 |
| Cast iron | −1.1 | −1.7 | −2.2 | −18.3 |

EXAMPLE 2

45% of potassium formate
2% of potassium hydroxide
2% of sodium metabisulfite
0.1% of 1H-benzotriazole
Comparison Example 2
45% of potassium formate
2% of potassium hydroxide
0.1% of 1H-benzotriazole Corrosion values according to ASTM D 1384-94 (material removed in g/m$^2$)

|  | Example 2 | | Comparison Example 2 | |
| --- | --- | --- | --- | --- |
| Metal | undiluted | diluted 1:1 | undiluted | diluted 1:1 |
| Copper | −0.9 | −1.6 | −6.1 | −25.0 |
| Brass | −2.2 | −2.7 | −33.2 | −42.0 |
| Steel | −1.2 | −1.2 | −6.9 | −1.0 |
| Cast iron | −1.3 | −1.9 | −11.2 | −42.6 |

EXAMPLE 3

46% of potassium formate
3% of potassium carbonate
1.5% of sodium sulfite
0.05% of sodium silicate
0.05% of 1H-benzotriazole
Comparison Example 3
46% of potassium formate
3% of potassium carbonate
0.05% of sodium silicate
0.05% of sodium silicate Corrosion values according to ASTM D 1384-94 (material removed in g/m$^2$)

|  | Example 3 | | Comparison Example 3 | |
| --- | --- | --- | --- | --- |
| Metal | undiluted | diluted 1:1 | undiluted | diluted 1:1 |
| Copper | −0.3 | −6.3 | −11.3 | −15.0 |
| Brass | −0.6 | −5.5 | −4.5 | −6.5 |
| Steel | +0.01 | −1.8 | −8.3 | −1.1 |
| Cast iron | −0.03 | −8.5 | −15.0 | −94.6 |

EXAMPLE 4

46% of potassium formate
2% of potassium carbonate
0.5% of borax
2% of sodium sulfite
0.05% of 1H-benzotriazole
0.05% of sodium metasilicate
Comparison Example 4
46% of potassium formate
2% of potassium carbonate
0.5% of borax
0.05% of 1H-benzotriazole
0.05% of sodium metasilicate Corrosion values according to ASTM D 1384-94 (material remnoved in g/m$^2$)

|  | Example 4 | | Comparison Example 4 | |
| --- | --- | --- | --- | --- |
| Metal | undiluted | diluted 1:1 | undiluted | diluted 1:1 |
| Copper | −0.9 | −2.2 | −5.2 | −7.5 |
| Brass | −2.4 | −5.9 | −7.5 | −9.6 |
| Steel | −1.6 | −0.4 | −0.9 | −4.1 |
| Cast iron | −5.4 | −6.2 | −33.5 | −53.8 |

The experiments show a marked improvement in the corrosion behavior with the additions according to the invention of sulfites, particularly on steel and cast iron, but also on nonferrous metals. The degree of frostproofing and the viscosity of the corresponding mixtures can be seen from the following comparison of characteristic data:

| Identification number | Pure potassium formate, 50% by weight without inhibitors | Brine according to the invention according to Example 4 |
| --- | --- | --- |
| Degree of frostproofing | −53° C. | −53° C. |
| Viscosity at −40° C. | 18 mm$^2$/s | 24 mm$^2$/s |
| Temperature stability | | |
| −40° C. | >7 days | >7 days |
| +60° C. | >7 days | >7 days |

The inhibitor combination added is stable in a temperature range from 40 to +80° C., that is without deposits or formation of crystals.

What is claimed is:

1. A coolant brine comprising greater than 40% of inhibited alkali metal acetates or formates having corrosion protection, wherein the coolant brines contain 0.2 to 5% by weight of alkali metal salts of sulfurous acid, and optionally contains alkaline compounds, nonferrous metal inhibitors or silicates.

2. A coolant brine as claimed in claim 1, wherein the coolant brines contain 0.5 to 3% by weight of alkali metal salts of sulfurous acid.

3. A coolant brine as claimed in claim 2, wherein the coolant brines contain 1 to 2.5% by weight of alkali metal salts of sulfurous acid.

4. A coolant brine as claimed in claim 1, in which the alkaline compounds are alkali metal carbonates, alkali metal hydroxides, alkali metal phosphates or alkali metal carbonates.

5. A coolant brine as claimed in claim 4, containing 0.5 to 3% by weight of the alkaline compounds.

6. A coolant brine as claimed in claim 5, containing 2 to 3% by weight of the alkaline compounds.

7. A coolant brine as claimed in claim 1, in which the nonferrous metal inhibitors are triazoles, imidazoles, benzotriazoles or mercaptobenzothiazoles.

8. A coolant brine as claimed in claim 7, containing 0.02 to 0.2% by weight of the nonferrous metal inhibitors.

9. A coolant brine as claimed in claim 7, containing 0.03 to 0.1% by weight of the nonferrous metal inhibitors.

10. A coolant brine as claimed in claim 1, containing 0.03 to 0.3% by weight of silicates.

11. A coolant brine as claimed in claim 10, containing 0.03 to 0.1% by weight of silicates.

* * * * *